United States Patent
DeSanti (10) Patent No.: US 9,258,185 B2
(45) Date of Patent: Feb. 9, 2016

(54) FIBRE CHANNEL OVER ETHERNET SUPPORT IN A TRILL NETWORK ENVIRONMENT

(71) Applicant: Claudio DeSanti, Oakland, CA (US)

(72) Inventor: Claudio DeSanti, Oakland, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 289 days.

(21) Appl. No.: 13/860,401

(22) Filed: Apr. 10, 2013

(65) Prior Publication Data

US 2014/0307578 A1 Oct. 16, 2014

(51) Int. Cl.
*H04L 12/24* (2006.01)
*H04L 29/08* (2006.01)
*H04L 12/46* (2006.01)
*H04L 12/931* (2013.01)

(52) U.S. Cl.
CPC ........ *H04L 41/0806* (2013.01); *H04L 12/4633* (2013.01); *H04L 12/4641* (2013.01); *H04L 49/357* (2013.01); *H04L 67/1097* (2013.01)

(58) Field of Classification Search
CPC ................................ H04L 41/12; H04L 45/02
See application file for complete search history.

(56) References Cited

U.S. PATENT DOCUMENTS

| 8,725,878 | B1 * | 5/2014 | Gillam | H04L 41/0836 709/226 |
| 2010/0290473 | A1 * | 11/2010 | Enduri | H04L 49/70 370/395.53 |
| 2012/0014253 | A1 * | 1/2012 | Rongong | H04L 49/35 370/235 |
| 2012/0044944 | A1 * | 2/2012 | Kotha | H04L 45/66 370/401 |
| 2012/0089714 | A1 * | 4/2012 | Carley | H04L 69/28 709/223 |
| 2012/0275787 | A1 * | 11/2012 | Xiong | H04L 49/357 398/45 |
| 2012/0327936 | A1 * | 12/2012 | Melman | H04L 69/18 370/392 |

OTHER PUBLICATIONS

Global Engineering, "Fibre Channel," Backbone -5 (FC-BB-5) Rev. 200, ANSIT INCITS Working Draft Proposed, Jun. 4, 2009, 180 pages; http://www.t11.org/ftp/t11/pub/fc/bb-5/09-056v5.pdf.
Cisco Systems, Inc., "Fibre Channel over Ethernet," At-A-Glance Paper, © 2010, 2 pages; http://www.cisco.com/en/US/solutions/collateral/ns340/ns517/ns224/ns945/ns1060/at_a_glance_c45-578384.pdf.
Intel®, Fibre Channel Over Ethernet (FCoE): Using Intel Ethernet Switch Family, White Paper, Nov. 2008, 12 pages; http://www.intel.com/content/dam/www/public/us/en/documents/white-papers/ethernet-switch-fcoe-paper.pdf.

(Continued)

*Primary Examiner* — Andrew Lai
*Assistant Examiner* — Zhiren Qin
(74) *Attorney, Agent, or Firm* — Patent Capital Group (57) ABSTRACT

An example method for Fibre Channel over Ethernet (FCoE) support in a Transparent Interconnection of Lots of Links (TRILL) network environment is provided and includes configuring at least two virtual storage area networks (SANs) in a TRILL network environment, which includes a plurality of leaf switches and spine switches, with each leaf switch being configured as a FCoE forwarder (FCF) enabled to forward frames according to FCoE protocol, and configuring at least an edge broadcast domain and a transport broadcast domain for each virtual SAN at each leaf switch. The edge broadcast domain includes end device links between the leaf switch and one or more end devices, and the transport broadcast domain includes spine links between the leaf switch and the spine switches.

17 Claims, 8 Drawing Sheets

(56) References Cited

OTHER PUBLICATIONS

Cisco Systems, Inc., "Fibre Channel over Ethernet Initialization Protocol" White Paper, © 2009, 12 pages; http://www.cisco.com/en/US/prod/collateral/switches/ps9441/ps9670/white_paper_c11-560403.html.

IBM, Redbooks, "Introduction to Storage Area Networks and System Networking," Nov. 2012, 362 pages; http://www.redbooks.ibm.com/redbooks.nsf/RedbookAbstracts/SG245470.html.

Cisco Systems, Inc., "Set up FCoE Connectivity for a Cisco UCS Blade," Product Guide, Document ID 110434, updated Apr. 4, 2010, 17 pages; http://www.cisco.com/image/gif/paws/110434/fcoe-vsan-connectivity.pdf.

U.S. Appl. No. 13/785,520, filed Mar. 5, 2013 entitled "Mitigating Issues Due to Firmware Upgrades in a Converged Network Environment," Inventors: Claudio DeSanti.

R. Perlman, et al., "Routing Bridges (RBridges): Base Protocol Specification," Internet Engineering Task Force, RFC 6325, Jul. 2011, 100 pages; http://tools.ietf.org/html/rfc6325.

\* cited by examiner

FIBRE CHANNEL OVER ETHERNET SUPPORT IN A TRILL NETWORK ENVIRONMENT

TECHNICAL FIELD

This disclosure relates in general to the field of communications and, more particularly, to a Fibre Channel over Ethernet (FCoE) support in a Transparent Interconnection of Lots of Links (TRILL) network environment.

BACKGROUND

A storage area network (SAN) transfers data between computer systems and storage elements through a specialized high-speed network. A SAN consists of a communication infrastructure, which provides physical connections. It also includes a management layer, which organizes the connections, storage elements, and computer systems so that data transfer is secure and robust. The SAN allows an any-to-any connection across the network, by using interconnect elements such as switches. The SAN introduces the flexibility of networking to enable one server or many heterogeneous servers to share a common storage utility. A network might include many storage devices, including disks, tapes, and optical storage. Additionally, the storage utility might be located far from the servers that use it.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for FCoE support in a TRILL network environment is provided and includes configuring at least two virtual storage area networks (SANs) in a TRILL network environment, which includes a plurality of leaf switches and spine switches, with each leaf switch being configured as an FCoE Forwarder (FCF) enabled to forward frames according to the FCoE protocol, and configuring at least an edge broadcast domain and a transport broadcast domain for each virtual SAN at each leaf switch. The edge broadcast domain includes end device links between the leaf switch and one or more end devices, and the transport broadcast domain includes spine links between the leaf switch and the spine switches.

Example Embodiments

Figure 1:
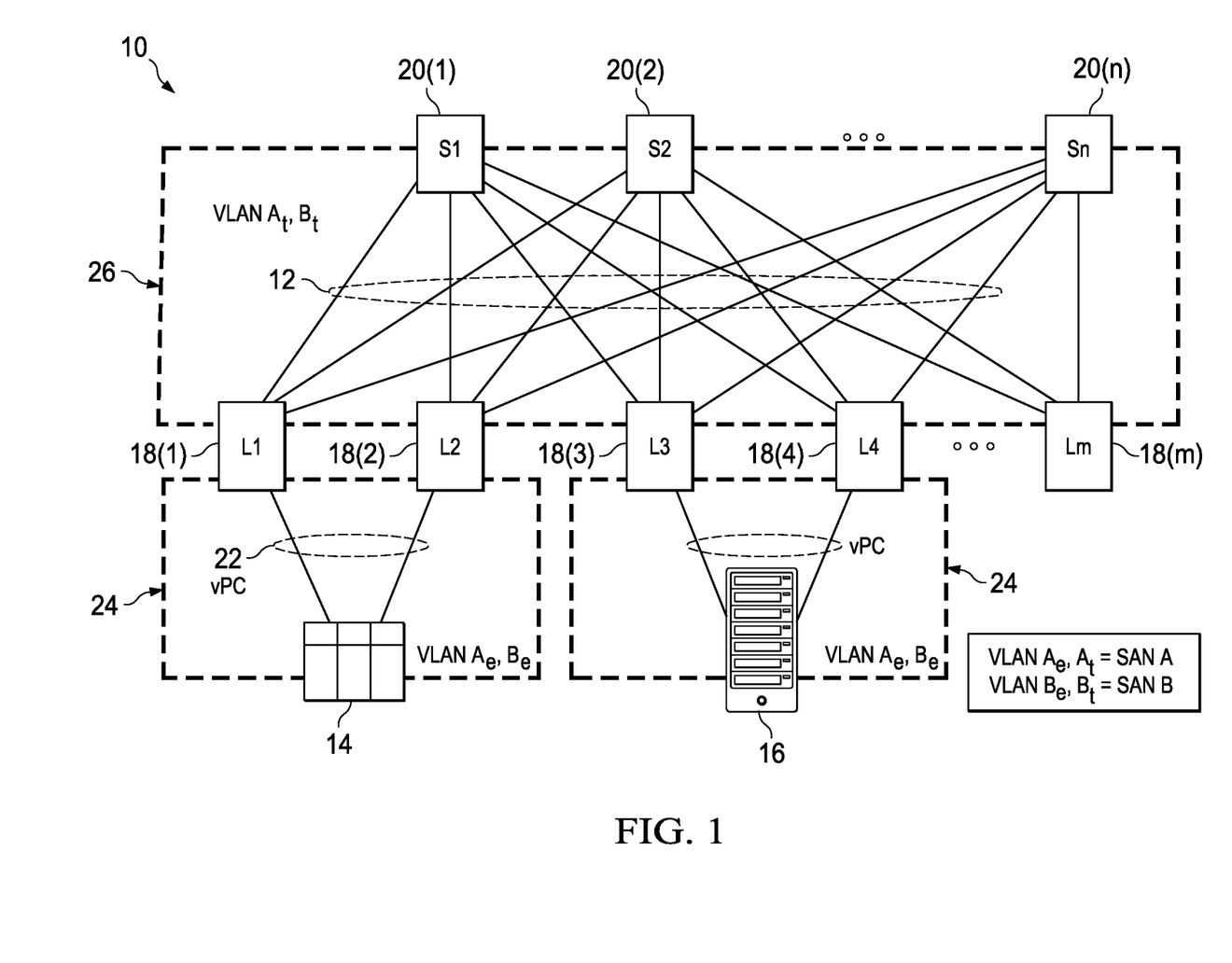
FIG. 1 is a simplified block diagram of a communication system for FCoE support in a TRILL network environment in accordance with one embodiment of the present disclosure.

FIG. 1 is a simplified block diagram of an example embodiment of a communication system 10 for providing FCoE support in a TRILL network environment. A TRILL network 12 includes one or more hosts 14 connected to one or more storage devices 16. TRILL network 12 may include leaf switches 18(1)-18(m) at a network edge in communication with spine switches 20(1)-20(m) at a network core. Each of hosts 14 may be connected to a corresponding couple of leaf switches 18(1)-18(m) on an end device link that uses a suitable port link aggregation architecture, referred to herein as virtual PortChannel (vPC) 22.

As used herein, the term "end device link" refers to a communication channel between any end device, such as one of hosts 14 or storage devices 16, and one of leaf switches 18(1)-18(m). The end device link can include more than one physical link (e.g., Ethernet connection). As used herein, "vPC" can include any suitable link aggregation architecture, including EtherChannel, where multiple physical links to two devices (e.g., routers, switches) are bundled together so that the links appear as a single link to a third device. The devices may be any network element, including switches, routers, fabric extenders, servers, etc.

Various embodiments of communication system 10 may implement a plurality of distinct storage area networks (SANs) of Fibre Channel (FC) as logical virtual SANs (VSANs) of Fibre Channel over Ethernet (FCoE) over a single TRILL network infrastructure. According to various embodiments, each virtual SAN may correspond to at least two broadcast domains. As used herein, "broadcast domain" includes a logical division of a network (e.g., network 12), in which all nodes (e.g., any electronic device, client, server, peer, service, application, or other object capable of sending, receiving, or forwarding information over communications channels in a network) can reach each other by broadcast or multicast (e.g., transmitting data to a plurality of recipients simultaneously) at the data link layer (i.e., Layer 2 in the seven layer OSI model). A broadcast domain can be within the same local area network (LAN) segment or it can be bridged to other LAN segments. Broadcast domains can be defined by virtual local area networks (VLANs) boundaries.

In an example embodiment, a SAN may be implemented on network 12 through two broadcast domains, which can include an edge VLAN 24 at the network edge (e.g., comprising applications, hosts, storage devices, etc. that facilitate provision of application services (e.g., hosting, storage, etc.)), and a transport VLAN 26 at the network core (e.g., comprising mesh of routers, switches, etc. that facilitate communication of data over the network). In an example embodiment, network 12 may include two distinct SANs (e.g., SAN A and SAN B) implemented as two edge VLANs (e.g., VLANs $A_e$ and $B_e$), and two transport VLANs (e.g., VLANs $A_t$ and $B_t$). VLANs $A_e$ and $A_t$ may correspond to SAN A, and VLANs $B_e$ and $B_t$ may correspond to SAN B. In some embodiments, instead of VLANs, VxLANs or any logical virtual local area network compatible with FCoE may be used, for example, in virtual switching architecture including distributed virtual switches.

Certain terminologies are used with regard to the various embodiments of the present disclosure. "TRILL network" refers to the network architecture (including variations and derivatives thereof) as defined in Internet Engineering Task Force (IETF) Standard Request for Comments (RFC) 6325 (and any relevant updates thereof), and commercial implementations or derivations of the IETF Standard, such as Cisco® FabricPath. "Storage Area Network" corresponds to a network connecting various network elements (e.g., servers, computers, etc.) with one or more storage devices (e.g., hard disk drives, tape drives, etc.), which include devices used exclusively for storing (e.g., recording) information (e.g., data). "FCoE" refers to a network protocol (including variations, and derivatives thereof) as specified by the International Committee for Information Technology Standards T11 FC-BB-5 standard (and any relevant updates thereof).

For purposes of illustrating certain example techniques of communication system 10, it is important to understand how typical communications may traverse the network. The following foundational information may be viewed as a basis from which the present disclosure may be properly explained. Such information is offered earnestly for purposes of explanation only and, accordingly, should not be construed in any way to limit the broad scope of the present disclosure and its potential applications.

A SAN can be used to bypass traditional network bottlenecks. It facilitates direct, high-speed data transfers between servers and storage devices, potentially in any of the following three ways: server to storage, where the same storage device is accessed serially or concurrently by multiple servers; server to server: where the SAN facilitates high-speed, high-volume communication between servers; storage to storage providing outboard data movement capability that enables data to be moved without server intervention, thus freeing up server processor cycles for other activities like application processing (e.g., a disk device that backs up its data to a tape device without server intervention, or a remote device mirroring across the SAN.

A conventional enterprise data center typically uses Ethernet for LAN communications and Fibre Channel (FC) for the SAN. In general, the LAN and the SAN address high availability in a fundamentally different way. In the LAN, a single redundant Ethernet network is used, and the best practice for redundancy relies on virtual Port Channels (vPCs) at the host level to access the Ethernet network. In the SAN, two physically separated SANs (SAN A, SAN B) are deployed, with hosts and storage devices connecting to both SANs. FC is a high-speed network technology (commonly running at 2-, 4-, 8-, and 16-gigabit speeds) primarily used in SANs. FC includes a topology where devices are connected to FC switches, conceptually similar to Ethernet switches. FC traffic generally requires a lossless transport layer because losing a single data packet in the data storage context may be unacceptable. In contrast, Ethernet is a best-effort protocol that discards packet in a congested network, and relies on higher level protocols to provide retransmissions and other reliability mechanisms.

FCoE enables convergence of the LAN and SAN, with an overlay of FC based SANs over a lossless Ethernet infrastructure of the LAN, removing the need for native FC switches or directors (FC fabric). FCoE is a Layer 3 protocol, and as such it is not tied to physical port constraints. Equipment, installation, and operational costs are significantly reduced in the converged environment and the resulting decrease in network complexity provides a corresponding increase in network reliability.

The FCoE protocol is generally defined by American National Standards Institute (ANSI) InterNational Committee for Information Technology Standards (INCITS) FC-BB-5 and FC-BB-6. The FC traffic encapsulated inside Ethernet uses the same lossless network characteristics that are found in a fabric network. Instead of a buffer-to-buffer (B2B) credit system used in native fabric topologies, FCoE may rely on Ethernet protocols and related standards that ensure lossless transport of the FCoE traffic. The Ethernet links used for FCoE can support the following Ethernet features to ensure lossless transport for the FCoE traffic: (1) Priority Flow Control (PFC) IEEE 802.1Qbb, which is an extension of a PAUSE (IEEE 802.3x) mechanism (PFC creates eight virtual links in each physical link and allows any of these links to be paused individually without affecting the flow of traffic in the other links); (2) Enhanced Transmission Selection (ETS) IEEE 802.1Qaz, which is a scheduling mechanism in hardware that allows a two-level Deficit Weighted Round Robin (DWRR) with strict priority support allowing control of bandwidth and latency; (3) Data Center Bridge eXchange (DCBX), which is a discovery and capability exchange protocol that can be used to verify that both ends of a link are configured properly to support lossless traffic.

Typically, FCoE uses virtual FC interfaces and a small set of control plane functions to build virtual links (e.g., a link is a communications channel that connects two or more nodes; the link may be generally an actual physical link or it may be a logical (e.g., virtual) link that uses one or more actual physical links) among pairs of virtual FC interfaces. Multiple virtual FC interfaces can be presented on the same physical Ethernet interface of a FCF. After the virtual links are established among pairs of virtual FC interfaces, the result is presented to the FC stack as a set of point-to-point connections that behave like regular FC connections, regardless of the number of FCoE pass-through switches that are physically inserted between the actual FC endpoints. FCoE technology uses FCoE Initialization Protocol (FIP) Discovery comprising control plane functions to enable discovery of FCoE-capable devices across FCoE pass-through switches and establishment of appropriate combinations of virtual links.

FCoE defines two types of endpoints for the Ethernet encapsulation of FC frames: FCoE Nodes (ENodes) and FCoE Forwarders (FCFs). ENode is a combination of FCoE termination functions and FC stack on converged network adapters (CNAs). FCFs are the combination of FCoE termination functions and FC stack on Ethernet switches (dual-stack switches). ENodes present virtual FC interfaces in the form of VN_Ports. FCFs present virtual FC interfaces in the forms of VF_Ports or VE_Ports. VN_Ports can handle creation, detection, and flow of message units to and from connected systems on the FC network and establish point-to-point FCoE virtual links with FCFs' VF_Ports. VE_Ports enable FCFs to establish FCoE virtual links with each other. FCoE virtual links replace physical Fibre Channel links by encapsulating FC frames in Ethernet frames (e.g., data packets on an Ethernet link). Each FCoE virtual link is identified by the MAC addresses of the two FCoE endpoints.

The FCoE protocol operates on a per-VLAN basis (e.g., an FCoE virtual link between two FCoE Virtual Ports, A and B, is uniquely identified by the following triplet: [MAC address of FCoE Virtual Port A, MAC address of FCoE Virtual Port B, FCoE VLAN ID]. Given a physical Ethernet interface (e.g., Ethernet port) on an FCoE device, the FCoE device establishes the virtual links for which the physical interface is configured in the one or more VLANs configured for FCoE usage. Typically, the configuration is represented in the form of one or more virtual FC interfaces mapped on top of the physical Ethernet interface. The information for the MAC addresses that characterize the virtual links can be statically configured on the FCoE device; additionally, or alternatively, FIP can be used to dynamically discover the information required. In other words, for every virtual FC interface configured on top of a physical Ethernet interface, FIP is responsible for discovering a pairing virtual FC interface elsewhere in the Ethernet network and establishing a virtual link between the two virtual interfaces in a specific FCoE VLAN.

The FCF communicates with FCoE end devices, such as CNAs to forward FC frames. The FC frame includes an FC destination identifier "D_ID" that indicates the intended recipient of the FC frame. The FCF accepts the FC frame encapsulated in an Ethernet packet and forwards the packet over a VLAN across the Ethernet network to a remote FCoE end device. Typically, the FCF updates source and destination media access control (MAC) addresses of the Ethernet header of the FCoE packet at each hop until the device corresponding to the D_ID is reached. In particular, the source MAC address is changed to the MAC address of the FCF forwarding the packet, and the destination MAC address is changed to the MAC address of either the destination (e.g., D_ID) indicated by the FC destination identifier, or the next FCF on the hop path towards the D_ID. At each hop, the FCF determines the destination MAC address for the next hop based on the D_ID and a routing protocol called Fabric Shortest Path First (FSPF).

Generally, FCoE packets are exchanged in a VLAN. For FCFs with a FC stack that includes multi-VSAN capabilities, the FCoE traffic belonging to different VSANs remain separated by different VLANs on the Ethernet plane. Some FCoE switches may include a mapping table between FCoE VLANs and FC VSANs. For each FC VSAN used in the Fibre Channel fabric, the administrator associates a unique FCoE VLAN over a specific network segment; FCoE packets tagged with that VLAN ID over that network segment are then assumed for FC control plane and forwarding purposes to belong to the corresponding FC VSAN.

With FCoE, the conventional FC SAN A/SAN B separation becomes logical rather than physical. In the converged infrastructure, a redundancy model for SAN traffic is aligned to proven techniques utilized for LAN traffic. Physical layer redundancy (e.g., resiliency to a single hardware fault) is related to the Ethernet physical infrastructure, therefore FCoE resiliency in a converged infrastructure would be based on Ethernet best practices (e.g. vPCs). Fabric level redundancy can be provided through a double Fabric model (i.e., SAN A/SAN B), however the separation of the two SANs is logically implemented as two different VSANs (virtual SANs) that map to two different VLANs (i.e., VLAN A and B). FC traffic in SAN A becomes FCoE traffic in VLAN A, FC traffic in SAN B becomes FCoE traffic in VLAN B, and the LAN traffic is carried in one or more additional VLANs over the converged Ethernet infrastructure. In this logical environment, the VSAN A/VSAN B configuration protects against fabric-wide control plane failures. Redundancy of the data plane is achieved through the Ethernet techniques (e.g., vPCs). This creates a huge value by making the data plane much more resilient. In native FC, the SAN A/SAN B separation provides data plane redundancy, however the failover is costly. In the converged network, a data plane failure or recovery is invisible to the SAN layer because it is handled at the underlying Ethernet layer.

Turning to TRILL networks, TRILL switches (also called RBridges) run a link state protocol amongst themselves, where connectivity is broadcast to the RBridges, so that each RBridge knows about the other RBridges, and the connectivity between them. Thus, RBridges obtain enough information to compute pair-wise optimal paths for unicast traffic routing, and calculate distribution trees for delivery of frames to destinations whose location is unknown or to multicast or broadcast groups.

The first (ingress) RBridge (RB1) that a unicast frame encounters in a network encapsulates the received frame with a link transport header and a TRILL header, which specifies the last (egress) RBridge (RB2) where the frame is decapsulated. The link transport header includes a source MAC address of the ingress Rbridge and a destination MAC address if the next hop Rbridge (as determined based on suitable shortest path algorithms). Note that the source MAC address and destination MAC address of the link transport header differ from the source MAC address and destination MAC address (e.g., indicating source host and destination host, respectively) of the underlying Ethernet frame. The source MAC address and destination MAC address of the link transport header are exposed to the Ethernet layer of each RBridge device that forwards the packet through the TRILL network.

Thereafter, transit RBridges (between the ingress Rbridge and egress Rbridge) act as link routers by replacing the link transport header at each hop with an appropriate source and destination MAC addresses header for the next hop Rbridge, and decreasing the hop count. Despite the modifications of the link transport header, the original encapsulated frame is preserved, including the original frame's VLAN tag. When the packet reaches the egress RBridge, the egress RBridge device decapsulates the packet by removing the link transport header and the TRILL header thereby exposing the destination MAC address of the original Ethernet packet to the Ethernet layer. In a general sense, RBridges are transparent to Layer 3 devices, and the links interconnected by RBridges appear to Layer 3 devices to be a single link. Only one RBridge acts as the ingress RBridge for any given frame and TRILL has an Appointed Forwarder mechanism to assure this. TRILL allows load splitting of the appointer forwarder duty on a link based on VLAN, so that only one RBridge on each link encapsulates and decapsulates native frames for each VLAN. In one specific implementation of the TRILL network, the Rbridges are divided into m leaf switches at the edge of the network that communicate among each other through n spine switches at the core of the network using TRILL encapsulation.

When FCoE is implemented in a TRILL network environment, the dual SAN A/SAN B separation can be problematic. TRILL assumes one physical network in which leaf switches provide the same services, to enable uniform server access to the network, in contrast with the traditional dual SAN A/SAN B physical separation of FC. Thus, a new approach is needed to enable uniform and predictable operations of FCoE in a TRILL network environment.

In accordance with one example implementation, as illustrated in FIG. 1, communication system 10 can resolve the aforementioned issues (and potentially others) associated with FCoE in a TRILL network environment. Embodiments of communication system 10 may implement broadcast domain separation of each virtual SAN, for example, to confine discovery. In various embodiments, FCoE FCF functionality, including Layer 3 switching, may be implemented at the network edge in leaf switches 18(1)-18(m). Leaf switches 18(1)-18(m) may forward FCoE frames through a Layer 3 FC lookup over an FCoE overlay topology for each edge VLAN 24. On the other hand, the core of the network, including spine switches 20(1)-20(n) may perform Layer 2 forwarding based on the destination MAC address of the link transport header.

Spine switches 20(1)-20(n) may be configured to forward FCoE frames through a Layer 2 lookup as Ethernet frames over the IS-IS computed TRILL topology, which computes routes for MAC address forwarding for each transport VLAN 26. At the Ethernet layer, forwarding of the FCoE frame may be performed based on the destination MAC address (DA).

FCoE creates the FCoE overlay virtual links on top of the underlying Ethernet topology, irrespective of the Ethernet topology and the protocol used to compute the MAC address routes. According to various embodiments, the FCFs implemented by leaf switches 18(1)-18(m) may be part of the FCoE overlay topology. Fabric Shortest Path First (FSPF) protocol (or other suitable routing algorithm) may determine a virtual link of the overlay topology to forward the FCoE frame based on the D_ID of the FCoE encapsulation. Given that a virtual link can be uniquely identified by a pair of MAC addresses associated with the two involved FCoE entities (e.g., VE_Ports) logically connected by it, identifying the virtual link can be equivalent to identifying the MAC addresses to use for the FCoE encapsulation on the transport network (e.g., between leaf switches 18(1)-18(m)). In some embodiments, to avoid out of order FCoE frames, some of the FCoE header fields, such as D_ID, source identifier (S_ID), and Originator Exchange Identifier (OX_ID) fields may be included in the FSPF computation (e.g., of a hash to determine the physical port or path to select when there are multiple equal cost paths).

Embodiments of communication system 10 may rely on Ethernet redundancy techniques (e.g., link aggregation) to ensure high availability against physical failures or data plane failures. For example, multiple spine switches 20(1)-20(n) may be used for resiliency in the core and FCoE over vPC may be implemented for resiliency of host access at leaf switches 18(1)-18(m). Moreover, embodiments of communication system 10 may rely on the logical separation of SANs to protect against fabric-wide control plane failures. Edge VLANs 24 may be configured on substantially all appropriate links of vPC 22, effectively making the SANs uniformly available everywhere. In embodiments that include legacy FCoE hosts without vPC 22, some leaf switches 18(1)-18(m) may be configured with just one of edge VLANs 24.

Embodiments of communication system 10 can implement a configuration equivalent to a plurality of physically distinct FC SANs by using a plurality of logically distinct virtual SANs of FCoE over the single TRILL network infrastructure relying on FCoE over vPC 22 to ensure high availability at the host attachment level. Embodiments of communication system 10 may enable network convergence (e.g., converging dual FC SANs into a single homogeneous infrastructure) through end-to-end FCoE, potentially leading to cost reductions in terms of equipment (e.g., less adapters, less switches), cabling (e.g., two cables in place of four), and management (e.g., need to manage one infrastructure, not two).

Turning to the infrastructure of communication system 10, network 12 represents a series of points or nodes of interconnected communication paths for receiving and transmitting packets of information that are delivered to communication system 10. Network 12 offers a communicative interface between storage devices 18 and/or hosts 16, and may be any local area network (LAN), wireless local area network (WLAN), metropolitan area network (MAN), Intranet, Extranet, WAN, virtual private network (VPN), or any other appropriate architecture or system that facilitates communications in a network environment and can provide lossless service, for example, similar to (or according to) FCoE protocols. Network 12 may implement any suitable communication protocol for transmitting and receiving data packets within communication system 10. The architecture of the present disclosure may include a configuration capable of transmission control protocol/internet protocol (TCP/IP) communications for the transmission and/or reception of packets in a network. The architecture of the present disclosure may also operate in conjunction with a user datagram protocol/IP (UDP/IP) or any other suitable protocol, where appropriate and based on particular needs.

Leaf switches 18(1)-18(m) and spine switches 20(1)-20(n) include network elements that can facilitate the FCoE support activities discussed herein. In some embodiments, leaf switches 18(1)-18(m) and spine switches 20(1)-20(n) may forward packets according to certain specific protocols (e.g., TCP/IP, UDP, etc.). As used herein in this specification, the term "network element" is meant to encompass routers, transceivers, cable boxes, gateways, bridges, loadbalancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one embodiment, leaf switches 18(1)-18(m) and spine switches 20(1)-20(n) include software to achieve (or to foster) the FCoE support activities discussed herein. In other embodiments, these FCoE support activities may be executed externally to these elements, or included in some other network element to achieve the intended functionality. Alternatively, leaf switches 18(1)-18(m) and spine switches 20(1)-20(n) may include software (or reciprocating software) that can coordinate with other network elements in order to achieve FCoE support activities described herein. In still other embodiments, one or several devices illustrated in the FIGURE may include any suitable algorithms, hardware, software, components, modules, interfaces, or objects that facilitate the operations thereof.

In one embodiment, spine switches 20(1)-20(n) may operate as a regular (e.g., normal, common, standard) TRILL core switch, without additional FCoE capabilities, such as FCF functionalities. Spine switches 20(1)-20(n) may include support for enhanced transmission selection (ETS) to implement shared inter-switch link (ISL) with Ethernet and FCoE traffic over the same ISL; priority based flow control (PFC) for FCoE traffic, and proper port channel hash (e.g., on D_ID, S_ID and selectable OX_ID) to avoid out-of-order frames. In one embodiment, leaf switches 18(1)-18(m) may operate as FCFs and TRILL edge switches concurrently. In addition to features described herein, leaf switches 18(1)-18(m) can include support for ETS to implement shared links, PFC for FCoE traffic, proper port channel hash (e.g., on D_ID, S_ID and selectable OX_ID), FCoE over vPC and FCoE over TRILL encapsulation.

Figure 2:
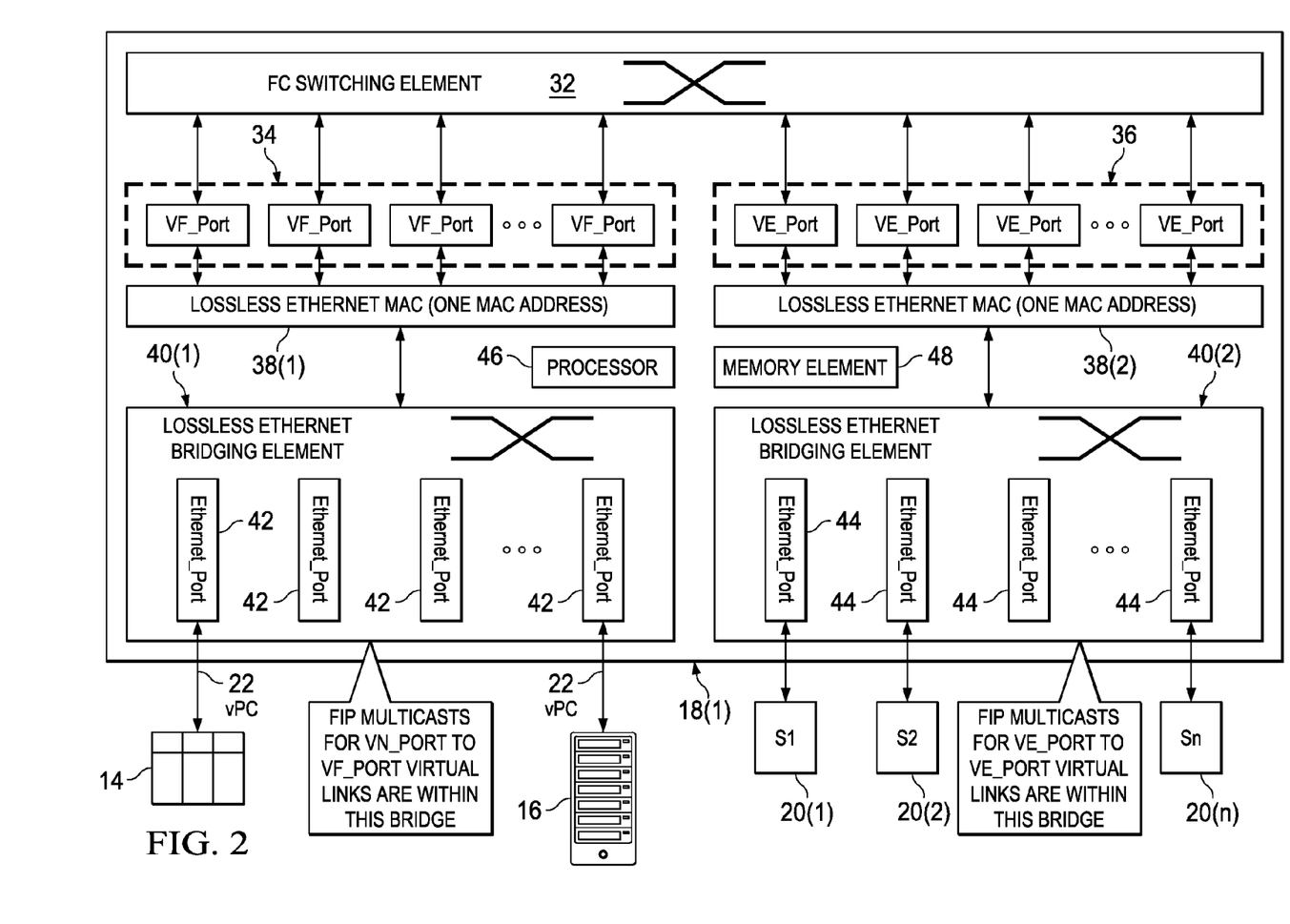
FIG. 2 is a simplified block diagram illustrating possible example details associated with the communication system in accordance with one embodiment.

FIG. 2 is a simplified block diagram illustrating certain details of an example leaf switch 18(1) according to an embodiment of communication system 10. Leaf switch 18(1) may include a FC switching element 32 to forward FC frames between FC entities 34 and 36 based on the D_ID of the FC frame encapsulated in a FCoE frame. FC entity 34 may include one or more VF_Ports and a lossless Ethernet MAC 36(1). FC entity 36 may include one or more VE_Ports (i.e., virtual E_Ports, which are ports connecting switches) and another lossless Ethernet MAC 38(2). Each VE_Port may correspond to one of other leaf switches in the network.

As used herein, the term "FC entity" includes an interface between an FC switching element (e.g., FC switching element 32) and a lossless Ethernet MAC (e.g., lossless Ethernet MAC 38(1) and 38(2)). As used herein, the term "lossless Ethernet MAC" includes a full duplex Ethernet MAC that supports at least 2.5 KB jumbo frames and implements extensions to avoid Ethernet frame loss due to congestion.

A lossless Ethernet bridging element 40(1) (e.g., a component with Ethernet bridging function supporting the minimum required capabilities of Lossless Ethernet MACS) can provide a physical transport gateway between lossless Ethernet MAC 38(1) and one or more Ethernet ports 42, which connect to end devices, such as hosts 14 and storage devices 16 over vPC 22. Likewise, another lossless Ethernet bridging element 40(2) can provide another physical transport gateway between lossless Ethernet MAC 38(2) and one or more Ethernet ports 44, which connect to spine switches 20(1)-20(n). A processor 46 and memory element 48 may facilitate the operations of example leaf switch 18.

In various embodiments, because FCoE uses FIP Discovery to discover MAC addresses of FCoE entities 34 and 36, to ensure predictable FIP Discovery behavior, a broadcast domain (e.g., VLAN $A_e$) used for VN_Port to VF_Port virtual links may be separated from another broadcast domain (e.g., VLAN $A_t$) used for VE_Port to VE_Port virtual links. To achieve separate broadcast domains, at least two different broadcast domains (e.g., VLANs) may be configured to map to a single VSAN (or SAN): edge VLAN 24 for Ethernet bridging element 40(1) connected to hosts 14 and storage devices 18 and transport VLAN 26 for Ethernet bridging element 40(2) connected to spine switches 20(1)-20(n). The FC configuration SAN A/SAN B can be supported through edge VLAN 24 and transport VLAN 26. FIP VLAN discovery can be used by hosts 14 to dynamically discover edge VLAN 24 from attached the leaf switch 18(1), and avoid manual VLAN configuration. FIP multicasts (or broadcasts) for VN_Port to VF_Port virtual links may be included within lossless Ethernet bridging element 40(1); FIP multicasts (or broadcasts) for VE_Port to VE_Port virtual links may be includes within lossless Ethernet bridging element 40(2).

Assume, merely for the sake of illustration, and not as a limitation, that network 12 includes two distinct SANs, SAN A and SAN B, each mapped to at least two distinct broadcast domains, namely edge VLANs $A_e$ and $B_e$, respectively, and transport VLANs $A_t$ and $B_t$, respectively. Separation of broadcast domains may be achieved by using distinct VLAN IDs in one example embodiment. In other embodiments, access control lists (ACLS) may be used to achieve the broadcast domain separation. Each leaf switch 18(1)-18(m) may be enabled to carry FCoE traffic, and configured with edge VLANs $A_e$ and $B_e$ appropriately. In some embodiments, VLANs $A_e$ and $B_e$ may be mapped to SAN A and SAN B, respectively, in suitable mapping tables in leaf switches 18(1)-18(m). Thus, leaf switches 18(1)-18(m) may be configured to carry FCoE traffic from end devices (e.g., hosts 14 and storage devices 16) over one of edge VLANs $A_e$ and $B_e$.

Each leaf switch 18(1)-18(m) may be configured with transport VLANs $A_t$ and $B_t$ appropriately. In some embodiments, VLANs $A_t$ and $B_t$ may be mapped to SAN A and SAN B, respectively, in suitable mapping tables in leaf switches 18(1)-18(m). Thus, leaf switches 18(1)-18(m) may be configured to carry FCoE traffic to spine switches 20(1)-20(n) over one of transport VLANs $A_t$ and $B_t$. vPC 22 between end devices (e.g., hosts 14 and storage devices 18) may be configured to carry traffic over edge VLANs $A_e$ and $B_e$. Thus, FCoE traffic over VLANs $A_e$ and $B_e$ may be allowed to traverse vPC 22.

When one of hosts 14 sends an FCoE frame to one of storage devices 16, the FCoE frame may be sent over one of edge VLANs $A_e$ or $B_e$ (say VLAN $A_e$, merely as an example). The FCoE frame may traverse vPC 22, configured to carry the VLAN $A_e$ traffic, and arrive appropriately at leaf switch 18(1) (as an example) according to the vPC connectivity and settings. Ethernet bridging element 40(1) may forward the frame based on the frame's destination MAC address (DA). If the DA of the received frame is the MAC address of lossless Ethernet MAC 38(1) (supporting the VF_Ports), the FCoE frame is provided to the appropriate VF_Port in FC entity 34 based of the source MAC address (SA). FC switching element 32 may forward the FC frame to FC entity 36 based on the D_ID using Layer 3 forwarding with FSPF algorithms on the FC overlay. Ethernet bridging element 40(2) may forward the frame from the VE_Port to appropriate Ethernet port 44 on the basis of the frame's destination MAC address. As each VE_Port corresponds to a leaf switch in the network, with a corresponding MAC address, the frame may be forwarded to the appropriate leaf switch over spine switches using L2 forwarding.

When leaf switch 18(1) receives a frame from one of spine switches 20(1)-20(n) over Ethernet port 44, Ethernet bridging element 40(2) may forward the frame based on the frame's destination MAC address. If the destination MAC address of the received frame is the MAC address of lossless Ethernet MAC 38(2) (supporting the VE_Ports), the FCoE frame is provided to the appropriate VE_Port in FC entity 36 based of the frame's SA. FC switching element 32 may forward the frame to the appropriate VF_Port based on the D_ID. Ethernet bridging element 40(1) may forward the frame to the appropriate Ethernet port 42 and onto the end device.

Figure 3:
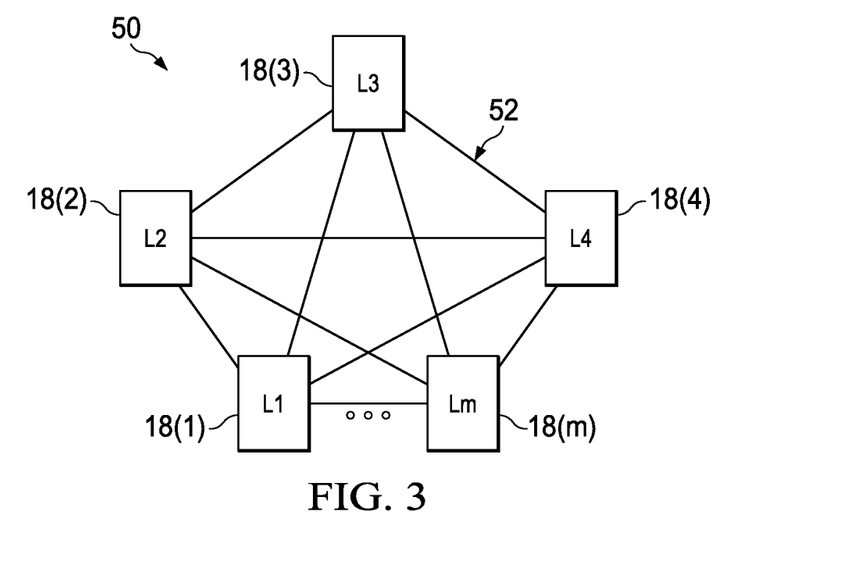
FIG. 3 is a simplified block diagram illustrating possible example details associated with the communication system in accordance with one embodiment.

FIG. 3 is a simplified block diagram illustrating an example topology 50 visible to FSPF algorithms according to embodiments of communication system 10. Topology 50 includes substantially all leaf switches 18(1)-18(m) (but not spine switches 20(1)-20(n), with each pair of leaf switches 18(1)-18(m) being connected by a FCoE virtual link 52. Each FCoE virtual link 52 can be identified by the pair of MAC addresses to which it connects. In the TRILL environment, IS-IS is used to compute the routes for MAC address forwarding. FCoE creates an overlay of FCoE virtual links on top of the underlying Ethernet topology, irrespective of the Ethernet topology and the protocol used to compute the MAC address routes. Thus, the topology seen by FSPF includes substantially all leaf switches 18(1)-18(m) per each of transport VLAN 26, and spine switches 20(1)-20(n) can be transparent to the FCoE frames.

Figure 4A:
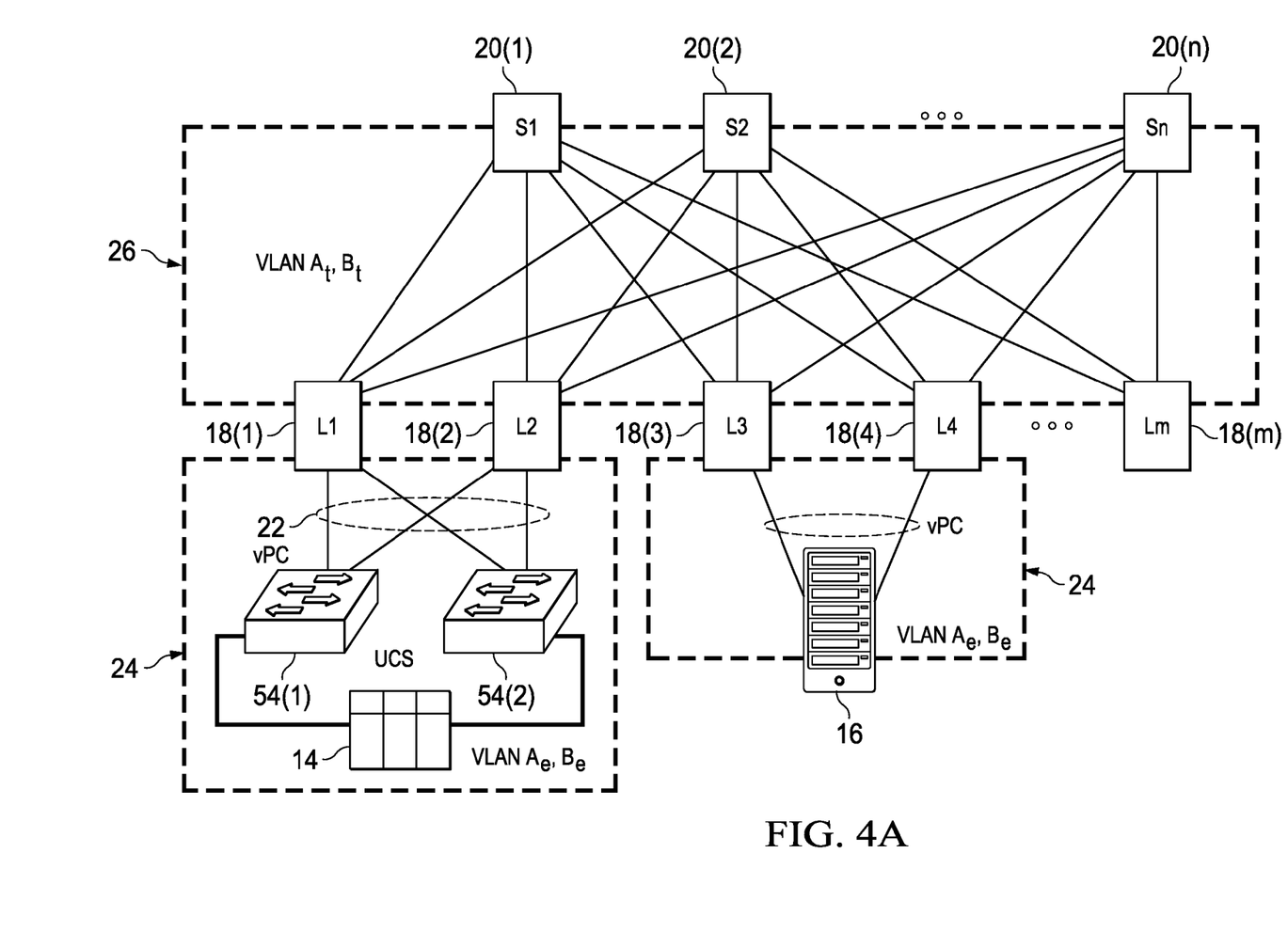
FIG. 4A is a simplified block diagram illustrating possible example details associated with the communication system in accordance with one embodiment.
Figure 4B:
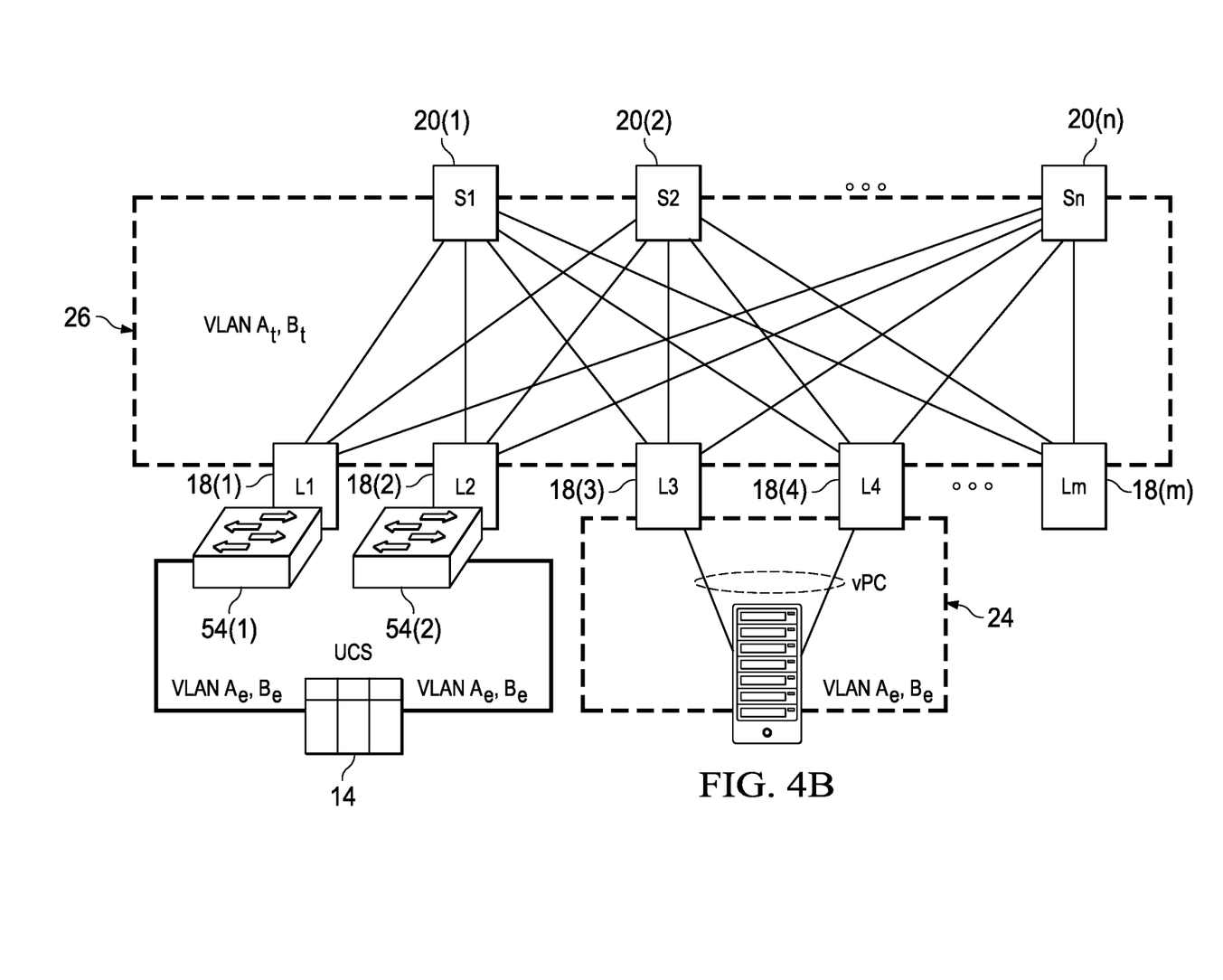
FIG. 4B is another simplified block diagram illustrating possible example details associated with the communication system in accordance with one embodiment.

FIGS. 4A and 4B are simplified block diagrams illustrating example details of an embodiment of communication system 10. FCoE may be implemented on a TRILL network topology with Unified Computing System (UCS) or other such network architecture that unifies computing, networking, management, virtualization, and storage access into a single integrated architecture. The UCS architecture enables end-to-end server visibility, management, and control in both bare metal and virtual environments, and facilitates the move to cloud computing and IT-as-a-Service with Fabric-Based Infrastructure. UCS includes a rack of servers (hosts 14) connected to one or more fabric interconnects (e.g., fabric interconnects 54(1) and 54(2)) and managed through a unified computing system appropriately.

FCoE can be supported in TRILL along with UCS in at least two ways, depending on the mode of operation of fabric interconnects 54(1) and 54(2) used in the UCS. In one mode of operation, as illustrated in FIG. 4A, fabric interconnects 54(1) and 54(2) may operate in end-host mode (or N_Port Virtualization (NPV) mode), without separate FC domain_IDs. Server blade adapters can join the fabric through a regular (e.g., normal, standard) fabric login (FLOGI) to leaf switches 18(1) and 18(2) via vPC links 22. The FLOGIs from the server blade adapters is translated by the NPV process in Fabric Interconnects 54(1) and 54(2) into Discover Fabric Service Parameters (FDISC) in the fabric. In another mode of operation, as illustrated in FIG. 4B, fabric interconnects 54(1) and 54(2) operate in a switch mode. In such embodiments, each fabric interconnect 54(1) and 54(2) may assume characteristics and functions of leaf switches 18(1) and 18(2).

When operating in end-host mode (e.g., as illustrated in FIG. 4A), in addition to the features discussed herein, fabric interconnects 54(1) and 54(2) can include support for ETS to implement shared links, PFC for FCoE traffic, proper port channel hash (e.g., on D_ID, S_ID, and selectable OX_ID), and FCoE over vPC when operating in the NPV mode (e.g., as illustrated in FIG. 4A). When operating in switch mode (e.g., as illustrated in FIG. 4B), in addition to the features described herein, fabric interconnects 54(1) and 54(2) can include ETS to implement shared links, PFC for FCoE traffic, proper port channel hash (e.g., on D_ID, S_ID, and selectable OX_ID), FCoE over vPC, and FCoE over TRILL encapsulation.

Figure 5:
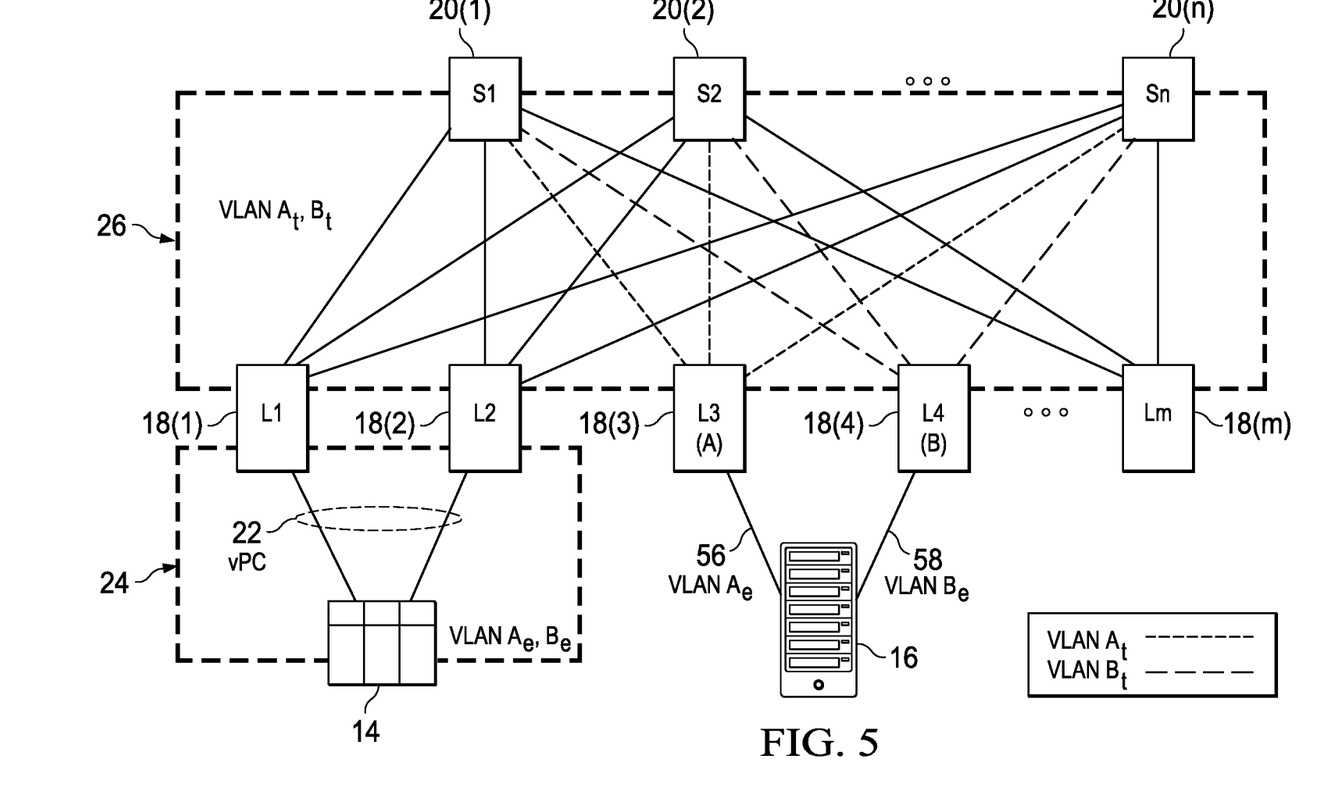
FIG. 5 is a simplified block diagram illustrating possible example details associated with the communication system in accordance with one embodiment.

FIG. 5 is a simplified block diagram illustrating example details of another embodiment of communication system 10. Legacy systems that do not support vPC or similar link aggregation technologies may be included in embodiments of communication system 10 by connecting them to a subset of leaf switches 18(1)-18(m) configured with one of edge VLANs 24. Assume, merely for example purposes and not as a limitation that network 12 is segregated into two separate SANs: SAN A and SAN B, with corresponding sets of edge and transport VLANs: $\{VLAN\ A_e, VLAN\ A_t\}$ and $\{VLAN\ B_e$ and $VLAN\ B_t\}$, respectively. Storage device 16 may not support vPC 22.

Storage device 16 may be connected to leaf switch 18(3) over link 56 (e.g., Ethernet link that is not aggregated) that may be configured to include one of edge VLANs 24, for example, $VLAN\ A_e$ (but not $VLAN\ B_e$). Storage device 16 may be connected to another leaf switch 18(4) over link 58 (e.g., Ethernet link that is not aggregated) that may be included to include another edge VLAN 24, for example, $VLAN\ B_e$. Leaf switch 18(3) would be included in the FCoE overlay for $VLAN\ A_e$, but not for $VLAN\ B_e$. Likewise, leaf switch 18(4) would be included in the FCoE overlay for $VLAN\ B_e$, but not for $VLAN\ A_e$. Thus, storage device 16 may be included in both edge VLANs $A_e$ and $B_e$, through two separate leaf switches 18(3) and 18(4). FCoE frames sent over $VLAN\ A_e$ would arrive at storage device 16 over leaf switch 18(3), whereas FCoE frames sent over $VLAN\ B_e$ would arrive at storage device 16 over leaf switch 18(4).

Figure 6:
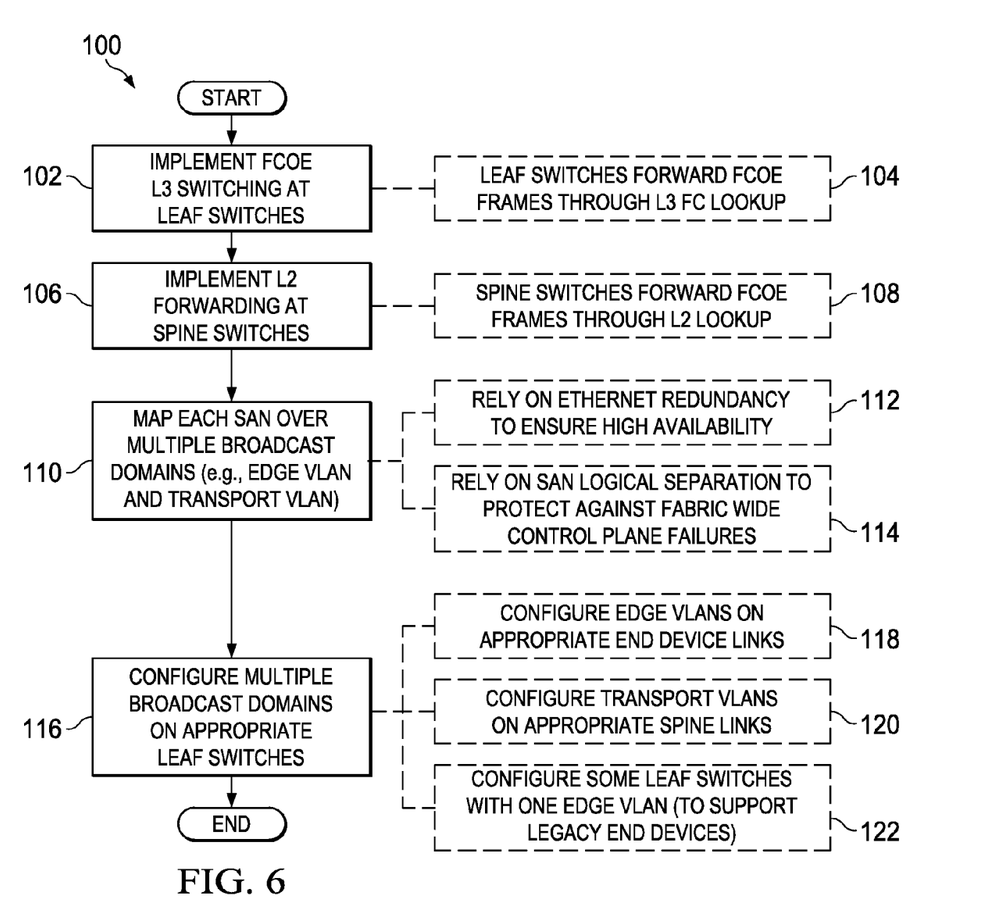
FIG. 6 is a simplified flowchart illustrating potential example operations that may be associated with embodiments of the communication system.

FIG. 6 is a simplified flow diagram illustrating example operations 100 that may be associated with embodiments of communication system 10. At 102, FCoE Layer 3 (L3) switching may be implemented at leaf switches 18(1)-18(m). In a specific embodiment, leaf switches 18(1)-18(m) forwarding FCoE frames through L3 FC lookup over FC overlay 50 at 104. At 106, Layer 2 (L2) forwarding may be implemented at spine switches 20(1)-20(n). In a specific embodiment, spine switches 20(1)-20(n) may forward FCoE frames through a L2 lookup of the destination leaf switch MAC address at 108. At 110, each virtual SAN may be mapped over multiple broadcast domains (e.g., edge VLAN 24 and transport VLAN 26). In a specific embodiment, communication system 10 may rely on Ethernet redundancy (e.g., through vPC 22) to ensure high availability at 112. At 114, communication system 10 may rely on SAN logical separation to protect against fabric wide control plane failures.

At 116, the multiple broadcast domains may be configured on each leaf switch 18(1)-18(m). For example, at 118, edge VLAN 24 may be configured on appropriate end device links (e.g., vPC 22). At 120, in a specific embodiment, transport VLAN 26 may be configured on appropriate spine links (e.g., Ethernet links connecting leaf switches 18(1)-18(m) with spine switches 20(1)-20(n)). At 122, in some embodiments, some of leaf switches 18(1)-18(m) may be configured with one of edge VLAN 24 (e.g., to support legacy end devices that cannot support vPC or other link aggregation technology).

Figure 7:
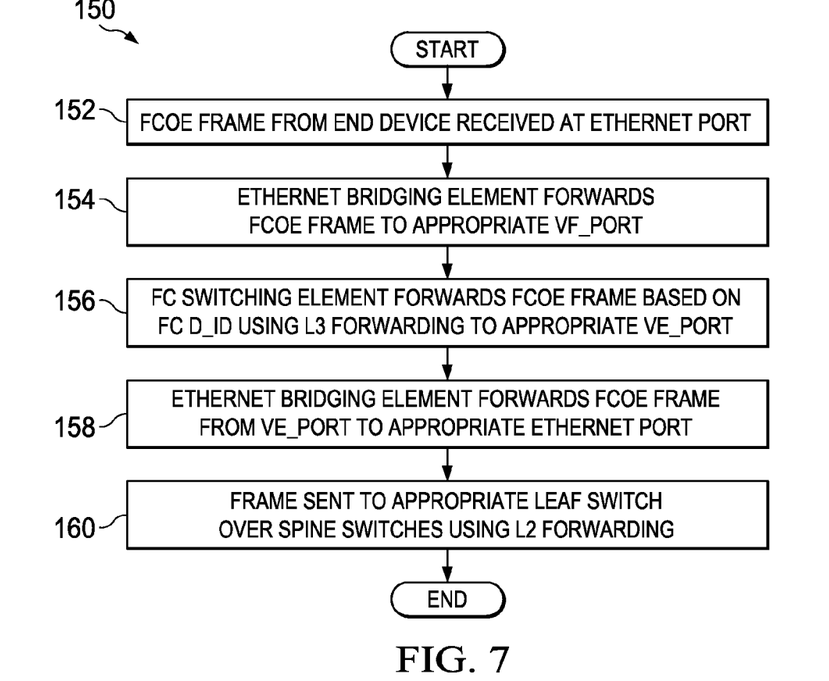
FIG. 7 is a simplified flowchart illustrating other potential example operations that may be associated with embodiments of the communication system.

FIG. 7 is a simplified flow diagram illustrating example operations that may be associated with an embodiment of communication system 10. Operations 150 may include 152, at which an FCoE frame may be received from an end device (e.g., hosts 14) at Ethernet port 42 on example leaf switch 18(1). At 154, Ethernet bridging element 40(1) may forward the frame to the appropriate VF_Port in FC entity 34. At 156, FC switching element 32 may forward the frame based on FC D_ID using L3 forwarding to the appropriate VE_Port on FC entity 34. The appropriate VE_Port may be determined from FSPF algorithms on the FC overlay in some embodiments. At 158, Ethernet bridging element 40(2) may forward the frame from the VE_Port to appropriate Ethernet port 44. As each VE_Port corresponds to a leaf switch in the network, with a corresponding MAC address, the frame may be forwarded to the appropriate leaf switch over spine switches using L2 forwarding at 160.

Figure 8:
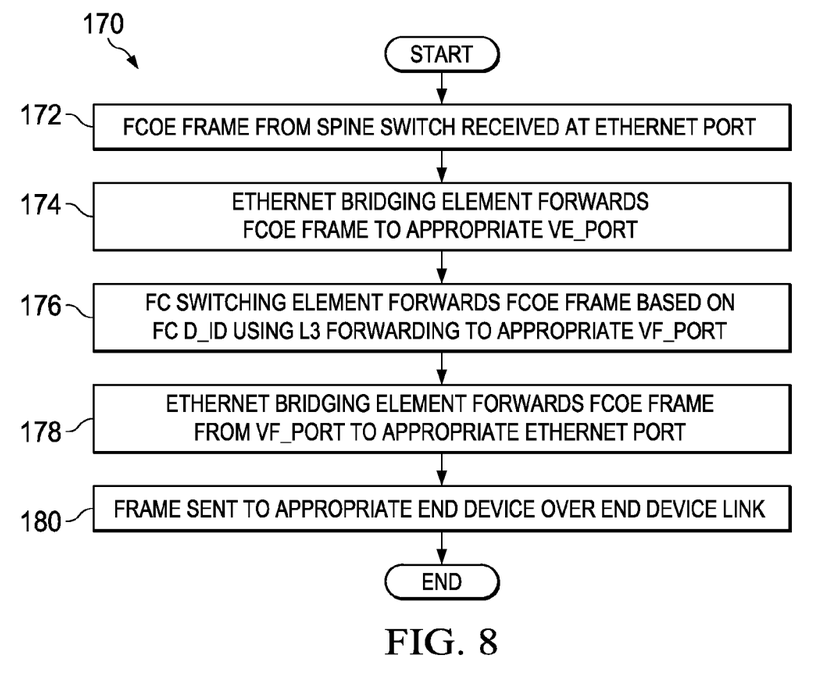
FIG. 8 is a simplified flowchart illustrating other potential example operations that may be associated with embodiments of the communication system.

FIG. 8 is a simplified flow diagram illustrating example operations that may be associated with an embodiment of communication system 10. Operations 170 may include 172, at which an FCoE frame may be received from one of spine switches 20(1)-20(n) at Ethernet port 44 on example leaf switch 18(1). At 174, Ethernet bridging element 40(2) may forward the frame to the appropriate VE_Port in FC entity 36. At 176, FC switching element 36 may forward the frame based on FC D_ID using L3 forwarding to the appropriate VF_Port on FC entity 34. At 178, Ethernet bridging element 40(1) may forward the frame from the VF_Port to appropriate Ethernet port 42 The frame may be forwarded to the appropriate end device (e.g., host 14 or storage device 16) over the end device link (e.g., vPC 22) at 180.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

In example implementations, at least some portions of the activities outlined herein may be implemented in software in, for example, leaf switches 18(1)-18(m) and spine switches 20(1)-20(n). In some embodiments, one or more of these features may be implemented in hardware, provided external to these elements, or consolidated in any appropriate manner to achieve the intended functionality. The various network elements (e.g., leaf switches 18(1)-18(m) and spine switches 20(1)-20(n)) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, leaf switches 18(1)-18(*m*) and spine switches 20(1)-20(*n*) described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some example embodiments, one or more memory elements (e.g., memory element 48) can store data used for the operations described herein. This includes the memory element being able to store instructions (e.g., software, logic, code, etc.) in non-transitory computer readable media, such that the instructions are executed to carry out the activities described in this Specification. A processor can execute any type of instructions associated with the data to achieve the operations detailed herein in this Specification. In one example, processors (e.g., processor 46) could transform an element or an article (e.g., data) from one state or thing to another state or thing.

In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory computer readable storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    configuring, by a processor, at least two virtual storage area networks (SANs) in a Transparent Interconnection of Lots of Links (TRILL) network environment that comprises a plurality of leaf switches and spine switches; and
    configuring, by the processor, at least one edge broadcast domain and at least one transport broadcast domain . . . at least two leaf switches through one or more fabric interconnects managed as a Unified Computing System (UCS) operating in an end-host mode, wherein the fabric interconnects are configured in a N_Port virtualization (NPV) mode.

2. The method of claim 1, wherein each leaf switch is configured as a Fibre Channel over Ethernet (FCoE) forwarder (FCF) enabled to transport frames according to an FCoE protocol.

3. The method of claim 1, wherein at least a portion of the end device links comprise virtual PortChannel links.

4. The method of claim 1, wherein each end device link in the TRILL network environment is configured with substantially all edge broadcast domains configured in the TRILL network environment.

5. The method of claim 1, further comprising:
  receiving a Fibre Channel over Ethernet (FCoE) frame at the leaf switch;
  forwarding the FCoE frame to an appropriate Fibre Channel (FC) entity based on a destination Media Access Control (MAC) address; and
  forwarding the FCoE frame to another appropriate FC entity based on a Layer 3 lookup of a FC device identifier (D_ID) on the edge broadcast domain.

6. The method of claim 5, wherein the FCoE frame is received through one of the end device links, wherein the appropriate FC entity comprise a VF_Port, and the another FC entity comprises a VE_Port.

7. The method of claim 5, wherein the frame is received through one of the spine links, wherein the appropriate FC entity comprise a VE_Port, and the another FC entity comprises a VF_Port.

8. The method of claim 5, further comprising:
  forwarding the FCoE frame by at least one spine switch to another leaf switch over a Layer 2 network on the transport broadcast domain.

9. The method of claim 1, wherein at least two of the leaf switches comprise fabric interconnects connected to a rack of servers and managed as a unified computing system (UCS).

10. Logic encoded in one or more non-transitory media that includes instructions for execution, which when executed by a processor is configured to perform operations, comprising:
  configuring at least two virtual storage area networks (SANs) in a Transparent Interconnection of Lots of Links (TRILL) network environment that comprises a plurality of leaf switches and spine switches; and
  configuring at least one edge broadcast domain and at least one transport broadcast domain . . . at least two leaf switches through one or more fabric interconnects managed as a Unified Computing System (UCS) operating in an end-host mode, wherein the fabric interconnects are configured in a NPV mode.

11. The media of claim 10, wherein at least a portion of the end device links comprise virtual PortChannel links.

12. The media of claim 10, wherein each leaf switch is configured as a Fibre Channel over Ethernet (FCoE) forwarder (FCF) enabled to transport frames according to an FCoE protocol.

13. The media of claim 10, wherein the operations further comprise:
  receiving a Fibre Channel over Ethernet (FCoE) frame at the leaf switch;
  forwarding the FCoE frame to an appropriate Fibre Channel (FC) entity based on a destination Media Access Control (MAC) address; and
  forwarding the FCoE frame to another appropriate FC entity based on a Layer 3 lookup of a D_ID on the edge broadcast domain.

14. An apparatus, comprising:
  configuring at least two virtual storage area networks (SANs) in a Transparent Interconnection of Lots of Links (TRILL) network environment that includes a plurality of leaf switches and spine switches; and
  configuring least one edge broadcast domain and at least one transport broadcast domain . . . at least two leaf switches through one or more fabric interconnects managed as a Unified Computing System (UCS) operating in an end-host mode, wherein the fabric interconnects are configured in a NPV mode.

15. The apparatus of claim 14, wherein each leaf switch is configured as a Fibre Channel over Ethernet (FCoE) forwarder (FCF) enabled to transport frames according to an FCoE protocol.

16. The apparatus of claim 14, wherein each end device link in the TRILL network environment is configured with substantially all edge broadcast domains.

17. The apparatus of claim 14, wherein the apparatus is further configured for:
  receiving a Fibre Channel over Ethernet (FCoE) frame at the leaf switch;
  forwarding the FCoE frame to an appropriate Fibre Channel (FC) entity based on a destination Media Access Control (MAC) address; and
  forwarding the FCoE frame to another appropriate FC entity based on a Layer 3 lookup of a D_ID on the edge broadcast domain.

* * * * *